Feb. 24, 1959 H. S. ROSENBAUM 2,874,447

APPARATUS FOR ASSEMBLING VENETIAN BLINDS

Filed Feb. 27, 1953 13 Sheets-Sheet 1

INVENTOR.
Harry S. Rosenbaum
BY
Webb Mackey & Burden
HIS ATTORNEYS

APPARATUS FOR ASSEMBLING VENETIAN BLINDS

Filed Feb. 27, 1953 13 Sheets-Sheet 2

INVENTOR.
Harry S. Rosenbaum
BY Webb Mackey & Burden
HIS ATTORNEYS

APPARATUS FOR ASSEMBLING VENETIAN BLINDS

Filed Feb. 27, 1953 13 Sheets-Sheet 3

INVENTOR.
Harry S. Rosenbaum
BY
Webb Mackey & Burden
HIS ATTORNEYS

APPARATUS FOR ASSEMBLING VENETIAN BLINDS

Filed Feb. 27, 1953 13 Sheets-Sheet 4

INVENTOR.
Harry S. Rosenbaum
BY
Webb Mackey & Burden
HIS ATTORNEYS

Feb. 24, 1959 H. S. ROSENBAUM 2,874,447

APPARATUS FOR ASSEMBLING VENETIAN BLINDS

Filed Feb. 27, 1953 13 Sheets-Sheet 5

INVENTOR.
Harry S. Rosenbaum

BY
Webb Mackey & Burden
HIS ATTORNEYS

APPARATUS FOR ASSEMBLING VENETIAN BLINDS

19

INVENTOR.
Harry S. Rosenbaum
BY
Webb Mackey & Burden
HIS ATTORNEYS

APPARATUS FOR ASSEMBLING VENETIAN BLINDS

Filed Feb. 27, 1953 13 Sheets-Sheet 7

INVENTOR.
Harry S. Rosenbaum
BY Webb Mackey & Burden
HIS ATTORNEYS

APPARATUS FOR ASSEMBLING VENETIAN BLINDS

Filed Feb. 27, 1953 13 Sheets-Sheet 8

INVENTOR.
Harry S. Rosenbaum
BY
Webb Mackey & Burden
HIS ATTORNEYS

Feb. 24, 1959 H. S. ROSENBAUM 2,874,447

APPARATUS FOR ASSEMBLING VENETIAN BLINDS

Filed Feb. 27, 1953 13 Sheets-Sheet 9

INVENTOR.
Harry S. Rosenbaum
BY Webb Mackey & Burden
HIS ATTORNEYS

APPARATUS FOR ASSEMBLING VENETIAN BLINDS

Filed Feb. 27, 1953 13 Sheets-Sheet 10

INVENTOR.
Harry S. Rosenbaum
BY
Webb, Mackey & Burden
HIS ATTORNEYS

APPARATUS FOR ASSEMBLING VENETIAN BLINDS

Filed Feb. 27, 1953 13 Sheets-Sheet 11

INVENTOR.
Harry S. Rosenbaum

BY
Webb Mackey & Burden
HIS ATTORNEYS

APPARATUS FOR ASSEMBLING VENETIAN BLINDS

Filed Feb. 27, 1953 13 Sheets-Sheet 12

INVENTOR.
Harry S. Rosenbaum
BY
Webb Mackey & Burden
HIS ATTORNEYS

APPARATUS FOR ASSEMBLING VENETIAN BLINDS

Filed Feb. 27, 1953

INVENTOR.
Harry S. Rosenbaum
BY
Webb, Mackey & Burden
HIS ATTORNEYS

United States Patent Office 2,874,447

Patented Feb. 24, 1959

2,874,447

APPARATUS FOR ASSEMBLING VENETIAN BLINDS

Harry S. Rosenbaum, Baltimore, Md.

Application February 27, 1953, Serial No. 339,265

21 Claims. (Cl. 29—24.5)

This application relates to apparatus for assembling Venetian blinds, particularly Venetian blinds having metal slats. Venetian blinds are a well-known article of commerce and require no description. The apparatus which I have invented receives slats which have been cut to the proper length and have had holes punched in them at the proper places for the lift cords and feeds the slats so cut and punched between the side and cross tapes of conventional Venetian blind ladder tapes. After the slats and tapes have been thus assembled, the apparatus holds them in position so that the tapes can be secured to conventional tilting mechanism. Thereafter, the apparatus lifts the assembled tilting mechanism, slats and tapes from that position so that bottom rails can be secured to the other ends of the ladder tapes. During this lifting operation, the apparatus threads lift cords through the holes in the slats.

Heretofore the assembly of Venetian blinds has been a significant part of the cost of manufacturing the blinds because of the large amount of manual labor required in this operation. My apparatus reduces the number of workers required and thereby materially reduces the cost of assembly. Also, my apparatus can be used to assemble blinds of various widths and varying spacing of the ladder tapes.

In the accompanying drawings, I have illustrated certain preferred embodiments of my invention in which—

GENERAL DESCRIPTION

Figures 1, 2:
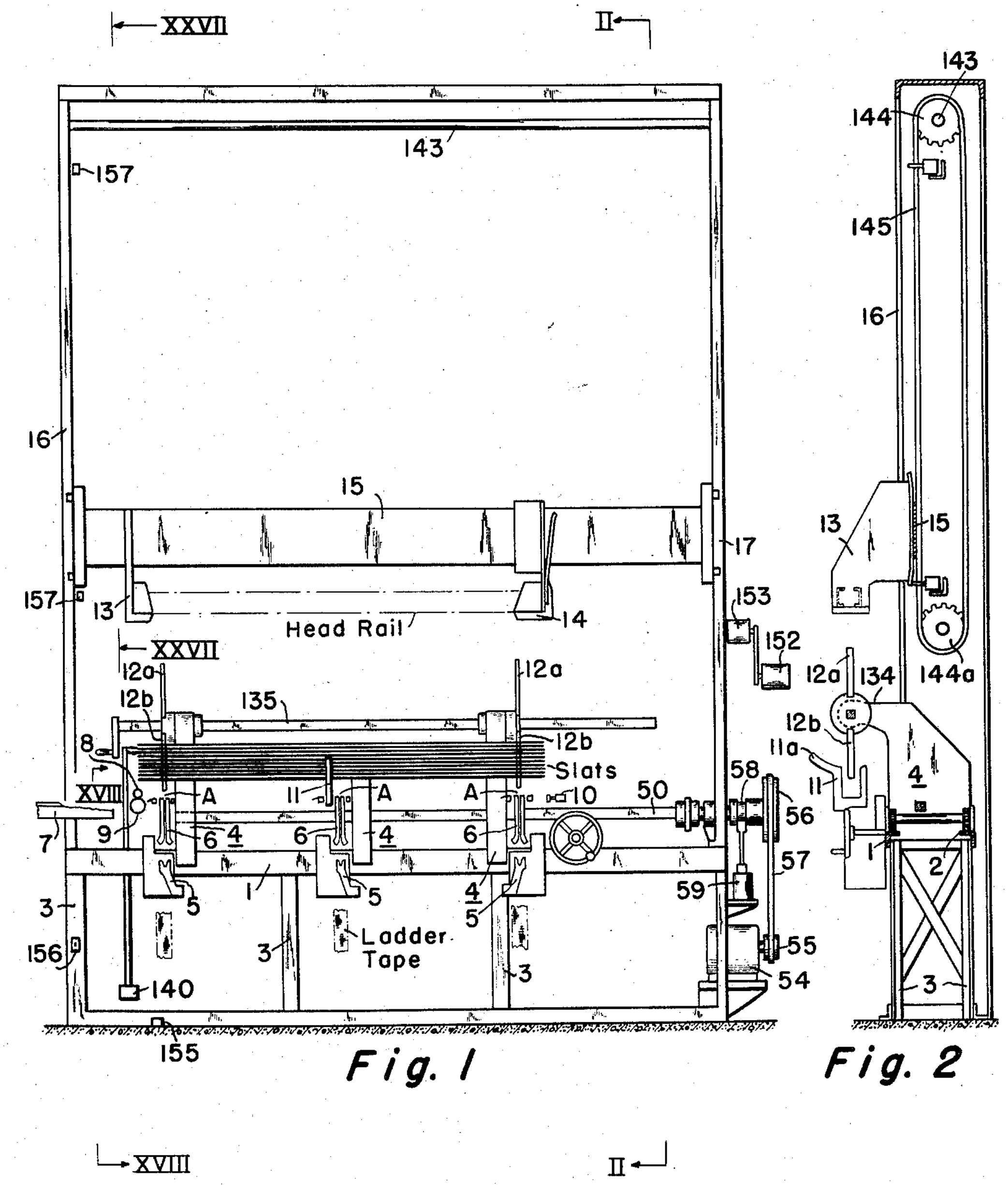
Figure 1 is a front elevation of my machine showing slats in position after they have been threaded through ladder tapes before lift cords have been threaded through the slats.
Figure 2 is a vertical section along the lines II—II of Figure 1 but without the slats.

Figure 1 shows a front elevation of my apparatus for assembling Venetian blinds. It has a base formed by two angle beams 1 and 2 (see also Figure 2) which are supported at table height by framework 3. The angles 1 and 2 extend the full length of the apparatus and together form a bed plate for the apparatus. The angles 1 and 2 carry assembly heads designated generally by the reference number 4 which are spaced from each other along the bed plate.

There is one assembly head for each ladder tape which is required for the blind being assembled. In the drawings, I have shown apparatus which can assemble blinds requiring two or three tapes. Additional heads can be added if blinds being assembled are of such width that additional ladder tapes are required. I will, however, describe my apparatus with reference to a "three-tape" blind in which there are three ladder tapes but only two lifting cords.

Each assembly head has a tape feeder 5 which is used to feed a ladder tape through and around a tape guide designated generally by the reference number 6 to a point of assembly marked A in Figure 1 for each assembly head. The tape guides 6 spread the side tapes and cross tapes of the ladder tapes so that slats can be passed between the cross tapes and the side tapes and also guide the cross tapes to alternate sides of needles for threading lift cords through the slats.

Slats are fed with their concave sides facing upwards and one at a time from a feed table 7 to feed rollers 8 and 9 which in turn feed the slats through the ladder tapes at the assembly points A. When each slat has passed through all of the tapes which are being assembled, the leading end of the slat hits a microswitch 10. Closing the microswitch actuates slat lifters (one for each assembly head and hereinafter described) which lift the slat up from the assembly points A. Lifting the slats lifts the ladder tapes since the slats have each been fed beneath a cross tape on each ladder tape and thus the ladder tapes are pulled in increments equivalent to the distance between the cross tapes past the assembly points A. The central assembly head has a vertical slat holder 11 and the two assembly heads 4, which are at each end of the machine, carry a support for lift cord needles 12*a* and 12*b* which, when in operative position, extend vertically upwardly and downwardly from their support. As shown in Figure 1, the needles extend downwardly to a point just above the assembly positions A. When the slats are lifted up into the slat holders 11, the needles pass through the holes in the slats which have been cut for the lifting cords. The slat holder 11 and the needles have latches which permit the slats to rise but which hold the slats in the raised position above the assembly positions A.

Figure 3:
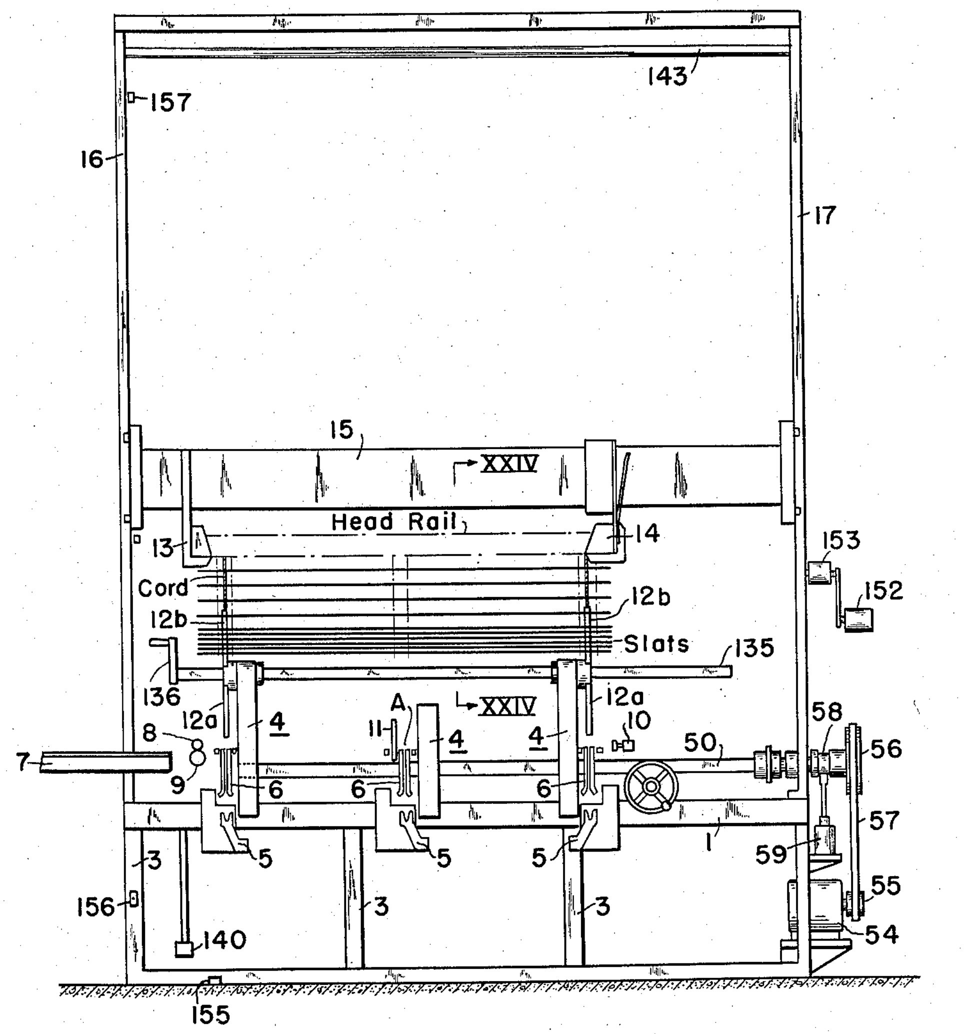
Figure 3 is a front elevation of my machine with the slats and tapes in position above the assembly heads prior to threading lift cords through the slats.

After all the slats required for the blind being assembled have been fed to the cross tapes and are held above the assembly positions A on one of the needles and in the slat holder 11, the needles 12*a* or 12*b*, whichever are carrying the slats and tapes, are rotated about their center 180° so that they extend vertically upward as shown in Figure 3. My apparatus also has a blind conveying mechanism which comprises brackets 13 and 14 carried on a flat bar 15 which can be raised and lowered in channels 16 and 17 which extend upwardly from each end of the base of the machine. A head rail is placed in the brackets 13 and 14 vertically in line with the slats and tapes carried by the upwardly extending needles 12*b* (see Figure 2). The side tapes of the ladder tapes are fastened to conventional tilting mechanism in the head rail and the bar 15 is raised in the channels 16 and 17 so that all of the tapes and slats are lifted off the needles. Before the bar 15 is raised, however, lift cords carried by the head rail are secured to the upper ends of the needles 12*b*. When the bar 15 is raised, the slats and the ladder tapes are pulled off the needles and the lift cords are pulled through the lift cord holes in the slats. After all of the slats have been lifted clear of the needles, the operator of the machine manually fastens a bottom bar to the lower end of the cross tapes and the head rail is lowered. While it is being lowered, the operator closes the blind by pulling on the lift cords. When the bar 15 comes down to the position shown in Figure 3, the fully assembled and closed blind can be lifted from the brackets 13 and 14 ready for packaging and shipping.

ASSEMBLY HEADS

There is an assembly head for each tape which is required for the Venetian blind being assembled. The particular embodiment of my invention described here can assemble two- or three-tape blinds. For both two-tape and three-tape blinds, there is a lifting cord needle adjacent each end assembly head. In three-tape blinds, there are only two lifting cords and, therefore, the central assembly head does not have a lifting cord needle or a reciprocating tape guide for feeding cross tapes on alternate sides of the needle. The first assembly head which the slats reach when being fed through the tapes, i. e., the left-hand end in Figure 1, is stationary. The balance of the heads are movable along the bed plate of the apparatus and the machine has mechanism for moving them along the table. The middle head also carries a slat holder 11 to support the slats above the assembly position A since it does not have a lift cord needle. Aside from these differences, the assembly heads are the same.

Figure 4:
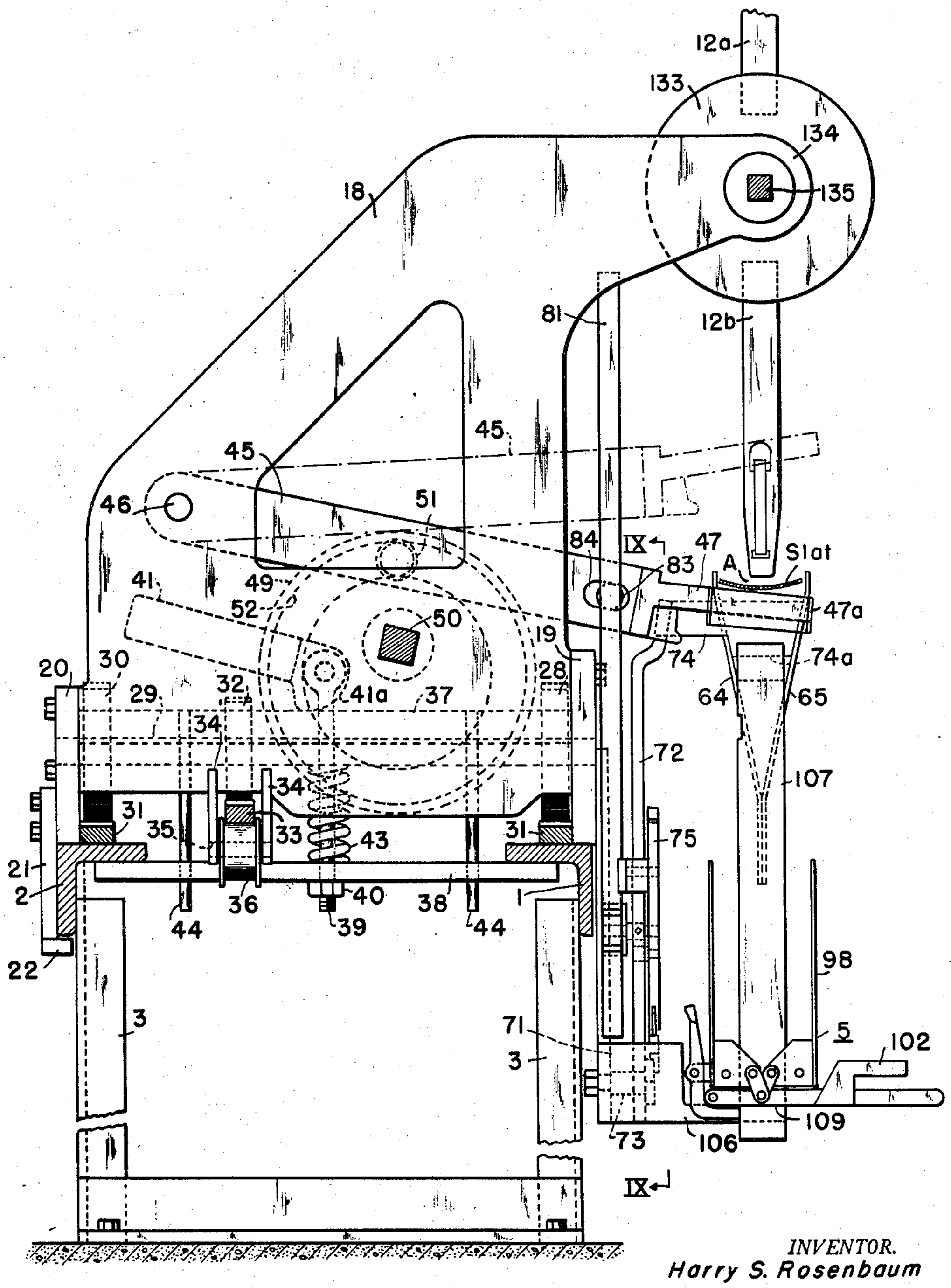
Figure 4 is a side elevation of the right-hand end assembly head shown in Figures 1 and 3, the view also including a section through the base of my machine.

Figure 4 is an elevation of the left side of the right-hand end assembly head shown in Figure 1.

Each assembly head comprises a flat plate-like casting 18 which extends vertically and across the bed plate from front to back. The casting has a front side plate 19 and a rear side plate 20 which side plates rest on the angles 1 and 2 and support the casting 18. The plate 20 also carries an additional plate 21 which extends below the angle 1 and which has an inwardly projecting flange 22 which extends beneath the vertical flange of the angle 1 and prevents the assembly head from rocking on the bed plate.

*Assembly head spacing mechanism and clamp*

Figures 5, 6:
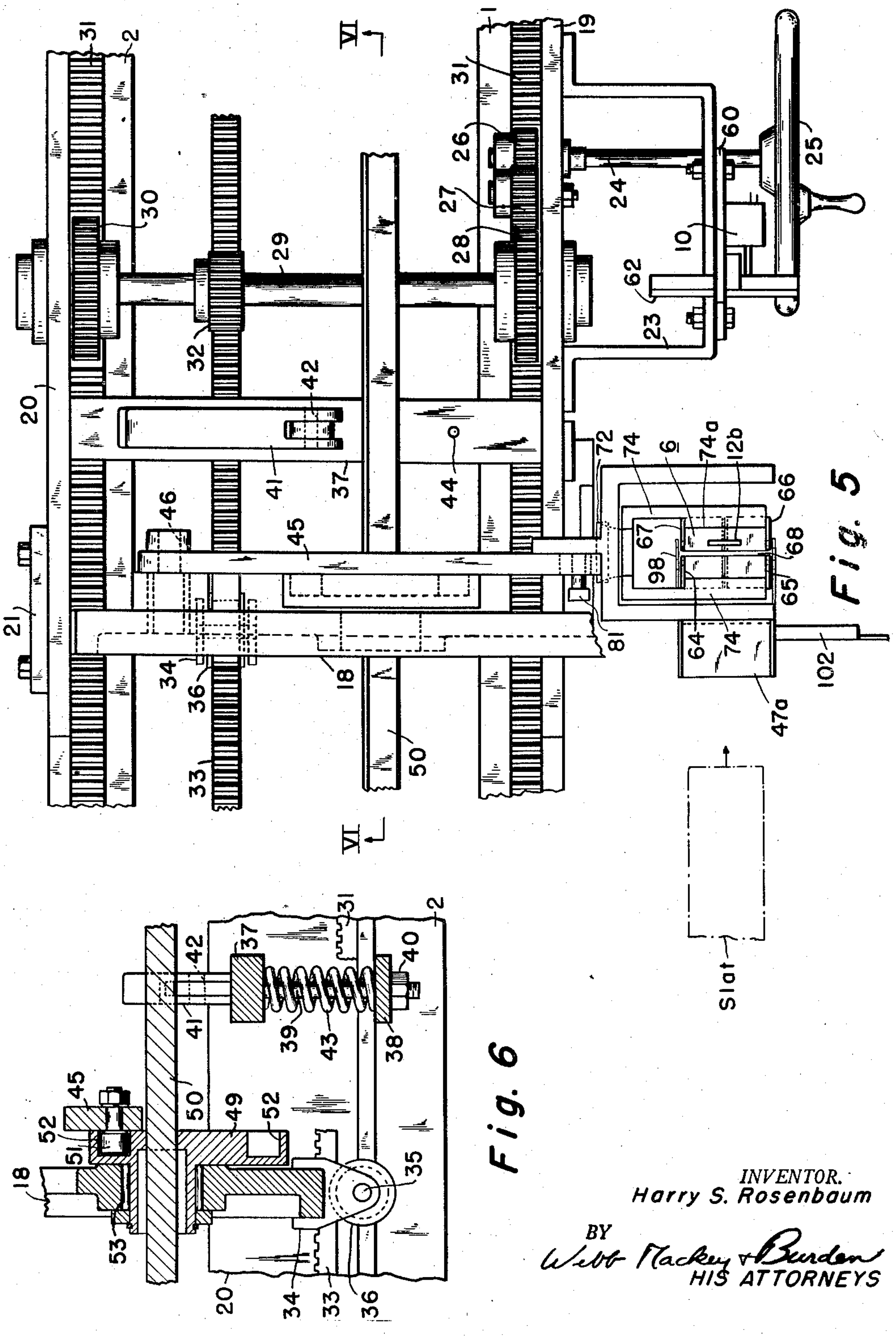
Figure 5 is a plan view of the assembly head shown in Figure 4 with the top portion of the assembly head removed.
Figure 6 is a vertical section along the lines VI—VI of Figure 5.

As above noted, all of the assembly heads are movable along the bed plate except the first head. Figure 5 shows the mechanism for adjusting the position of the other heads along the bed plate. A bracket 23 extending outwardly from the side plate 19 of the assembly head 4, which is at the right-hand end of the machine (the bracket is omitted from Figure 4 for clarity of illustration), carries a shaft 24 on the forward end of which is a handwheel 25. The inner end of the shaft carries a pinion gear 26 which meshes with a second pinion gear 27 which in turn meshes with a larger pinion gear 28. A shaft 29 journaled in the side plates 19 and 20 carries the gear 28, and, also, at its other end, but within the side plate 20, a gear 30 which is the same in diameter and pitch as the gear 28. The angles 1 and 2 support gear racks 31 which extend along the angles 1 and 2 adjacent the inner sides of the side plates 19 and 20 and the gears 28 and 30 mesh with the gear racks 31. As appears in Figure 5, rotation of the handwheel 25 turns the gears 28 and 30 and this will move the assembly head which carries the shaft 29 and the gears 28 and 30 along the bed plate.

Additional mechanism is required to move the central assembly head since it moves half the distance that the right-hand end assembly head moves. Referring to Figure 5, the shaft 29 also carries between the gears 28 and 30, a third gear 32 which turns with the shaft. The gear 32 meshes with a third gear rack 33 which is supported by the central and right-hand assembly heads. Figure 4 shows the support for this rack which is carried by these assembly heads. Arms 34 secured to and extending downwardly from the casting 18 carry adjacent their lower ends a shaft 35 on which a roller 36 freely turns. As shown in Figure 4, the rack 33 rides on one of these rollers in each head. The central assembly head has a shaft and gears similar to the shaft 29 and gears 28, 30 and 32 of the right-hand end assembly head and a similar support for the rack 33. Rotation of the handwheel 25 to move the right-hand assembly head turns the shaft 29 and the gear 32, and thereby moves the gear rack 33. The gear rack 33 meshes with the gear carried by the central assembly head, which is the same as the gear 32, and thereby rotates the shaft and the gears in the central head which are the same as the shaft 29 and gears 28 and 30 thereby move the central assembly head. It will be noted that the gear 32 has one-half the diameter of the gears 28 and 30. Therefore, the central assembly head moves one-half the distance that the right-hand assembly head moves.

After the assembly heads have been positioned on the bed plate in accordance with the width of a blind being assembled, it is, of course, important that they be fixed in that position. I provide a clamp for that purpose. This clamp comprises a plate 37 which extends across the bed plate and is welded at its ends to the side plates 19 and 20 and a second plate 38 which also extends across the bed plate beneath the horizontal flanges of the angles 1 and 2. The plate 38 is carried by a rod 39 which extends through the two plates 37 and 38 and has a nut 40 at its lower end beneath the plate 38. The upper end of the rod 39 carries a cam handle 41 which rotates on a pin 42 passing through the upper end of the rod 39. As appears in Figure 4, if the handle 41 is moved from a vertical to a horizontal position, the cam surface $41a$ acting against the plate 37 raises the plate 38 up against the horizontal flanges of the angles 1 and 2. A coilspring 43 tends to separate the plates 37 and 38 against the action of the cam handle 41. Rods 44 carried by and extending downwardly from the plate 37 and passing through holes in the plate 38 act as guides for the plate 38.

*Slat lifter*

As noted above, after the slats have been passed through the cross tapes and side tapes of the ladder tapes, they are lifted from the assembly points A up into the slat holder 11 on the central assembly head and over lift cord needles on the other heads. Each assembly head carries a slat lifter for carrying out this operation. Referring to Figure 4, it will be seen that the slat lifter comprises a lever 45 pivoted at one end on a pin 46 carried by the casting 18 and having at its other end a two-pronged fork 47, the two prongs of which extend beneath the slats on either side of the ladder tapes as they pass over and through the tape guide 6 which is also carried by each assembly head as will be later described.

Each slat lifter 45 moves from the position shown in Figure 4 in solid lines to the position shown in chain lines in Figure 4 to lift slats upwardly in the slat holder 11 and over the needles, the needles passing through the lift cord holes in the slats. The drive for this action comprises an eccentric cam wheel 49 carried on a drive shaft 50 (see Figures 4 and 6). The slat lifter 45 carries a cam follower 51 which rides in a cam groove 52 in the wheel 49. As is apparent from Figures 4 and 6, rotation of the cam wheel 49 will pivot the slat lifter 45 about the pin 46 and thereby raise and lower the fork 47 at the free end of the slat lifter.

As appears in Figure 6, the cam wheels 49 turn in bearings 53 carried by the castings 18 of the assembly heads and the wheels 49 carry the drive shaft 50 which is square in section so as to key the shaft to the wheels. Referring to Figure 1, it will be seen that the drive shaft 50 extends beyond the right-hand assembly head 4 and beyond the channel 17 in which it is also journaled. A motor 54 drives the shaft 50 through pulleys 55, 56 and belt 57, and a roller clutch 58. The motor 54 runs continuously and it is necessary to actuate the clutch 58 to turn the shaft 50. The movement of the slats through the cross tapes actuates the clutch 58. When the forward ends of the slats strike the microswitch 10, it actuates a solenoid 59 which in turn actuates the clutch 58, whereupon the shaft 50 turns through one revolution. During this one revolution, the slat lifter is raised and lowered from its lowest to its highest position and back again.

Figure 7:
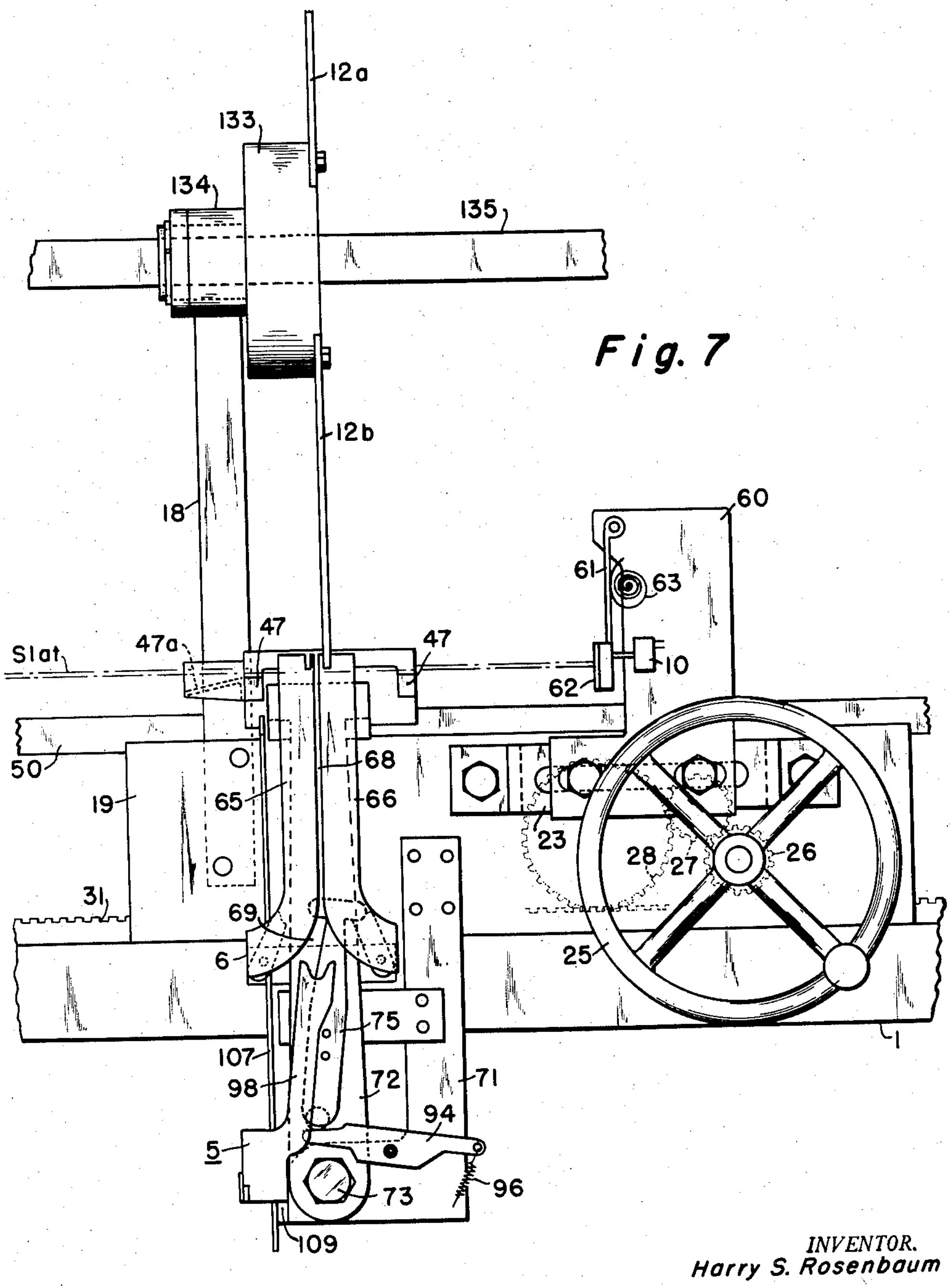
Figure 7 is a front elevation of the assembly head shown in Figures 4 and 5.

Figures 5 and 7 show the mounting of the microswitch 10 and the operating mechanism therefor. A plate 60 extends upwardly from the bracket 23 and carries at its upper end a swinging stop 61, the lower end of which has a crosspiece 62 which extends across the end of the path of the slats (see Figure 7). When the slats strike the crosspiece 62, it moves in the direction of the travel of the slat against the microswitch 10 and actuates the microswitch. To assist the switch in returning to its original position and to thereby correctly position the slat, a coilspring 63, also carried by the plate 60, presses against the swinging stop 61.

As appears in Figure 7, the plate 60 is bolted to the bracket 23 through slots in both the bracket and in the plate so that the position of the microswitch 10 relative to the assembly head can be properly adjusted and so that, therefore, the holes in the slats for the lifting cords will come directly under the needle arms $12b$.

*Tape guide*

Each assembly head also carries a guide for leading the ladder tapes to the assembly points A. Referring to Figures 4, 5 and 7, each tape guide comprises four flat plates

64, 65, 66 and 67. As appears in Figure 4, the front plates 65 and 66 and the rear plates 64 and 67 extend vertically for a short distance at their upper ends adjacent the assembly points A and then the front and rear plates slope towards each other until they join adjacent their lower ends and extend vertically and parallel to each other for the balance of their lengths. The two front plates and the two rear plates are spaced from each other so as to form a slot 68 between them. The plates are also curved outwardly at their lower ends to form a V-shaped entry 69 for the slot 68. As will be described later, a tape feeder 5 carries the ladder tapes up over the guide plates so that the plates 64, 65, 66 and 67 are between the side tapes of the ladder tapes and the cross tapes are in the slot 68. The V-shaped entry 69 guides the cross tapes into the slot 68. Since the distance between the front plates and the rear plates gradually increases from bottom to top (see Figure 4) the side tapes are gradually spread apart. The front plates are spaced from the rear plates so that the side tapes are spaced apart substantially the maximum distance permitted by the cross tapes when the ladder tapes are at the assembly points A.

In conventional ladder tapes for Venetian blinds, the cross tapes alternate from edge to edge of the side tapes so that, in an assembled blind, the cross tapes are on alternate sides of the lifting cord. In assembling Venetian blinds with my apparatus, it is, therefore, necessary that the cross tapes be led by the tape guides on opposite sides of the lifting cord needles $12a$ or $12b$. Stated differently and referring to Figure 7, it is necessary that the slot 68 for the cross tapes be brought alternately on one side and then the other of the needle $12b$. In my apparatus the support for the tape guide accomplishes this function. This action is, of course, required only of the tape guides mounted on assembly heads which also have lift cord needles. In the machine shown in the drawings, the central assembly head does not have a lift cord needle and the tape guide is fixedly mounted on the head.

Referring to Figures 4 and 7, an L-shaped bracket 71 extends downwardly from the front side plate 19 of the assembly head and beneath the assembly points A. The bracket in turn supports a long straight bracket 72 which pivots on a bolt 73 carried by the horizontal arm of the bracket 71. At its upper end, the bracket 72 has two forwardly horizontally extending arms 74 with trapezoidal side plates $74a$ to which the guide plates 64–67, inclusive, are welded.

Figures 8, 10, 11:
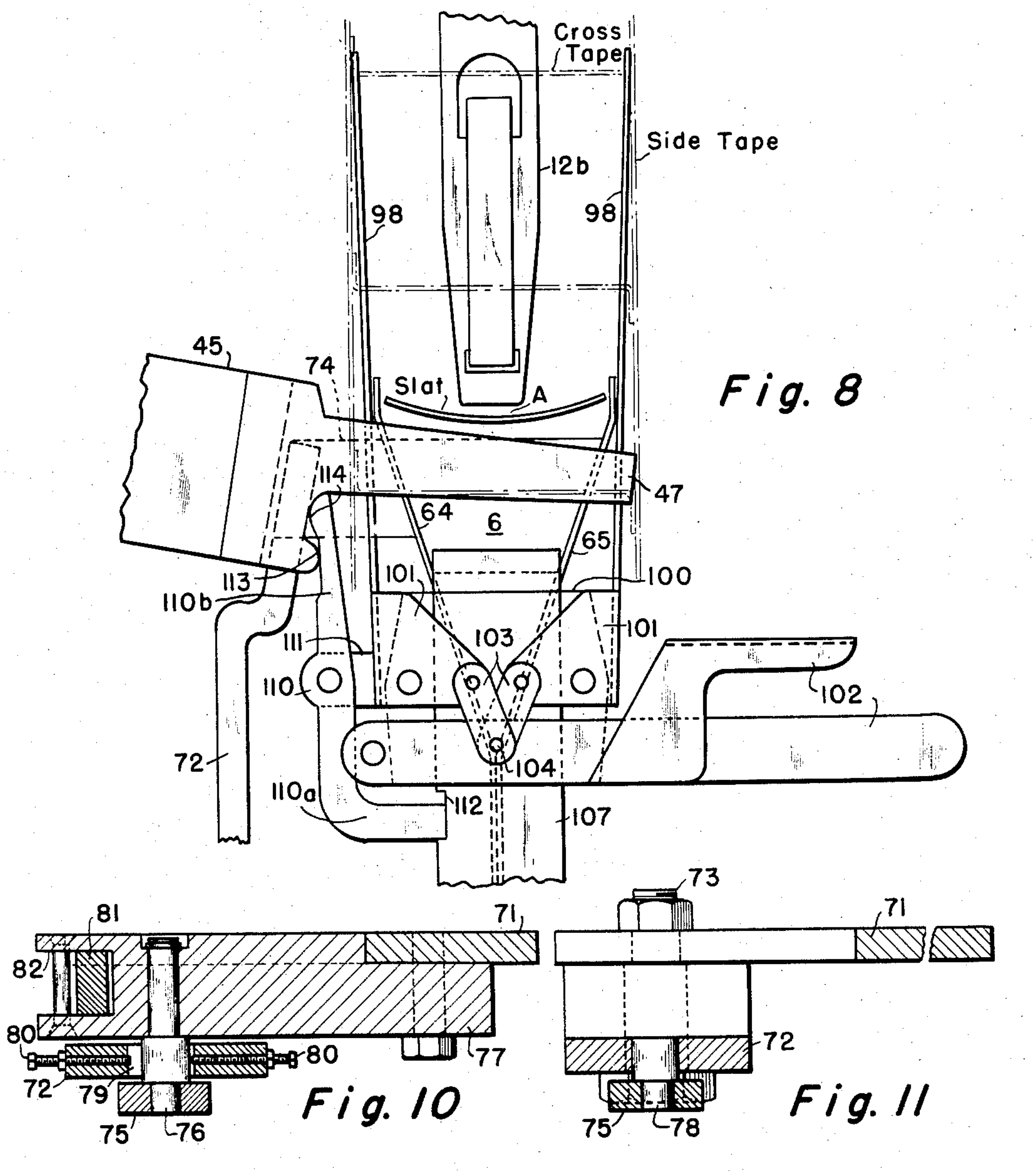
Figure 8 is a side elevation of a portion of the assembly head shown in Figure 4.
Figure 10 is a section along the lines X—X of Figure 9.
Figure 11 is a section along the lines XI—XI of Figure 9.

My apparatus also includes mechanism for reciprocating the bracket 72 about the bolt 73 so as to place the slot 68 on alternate sides of the needle arm $12b$. This mechanism is shown in Figures 9–13, inclusive. The bracket 72 carries a pivot lever 75. Both the bracket and the lever pivot on a pin 76 carried by a horizontal bracket 77 (see Figure 10) secured to the bracket 71. A second pin 78 extends through only the bracket 72 and the lever 75. When the lever is turned clockwise (viewing Figure 9) on the pin 76, the bracket 72 will pivot counterclockwise about the bolt 73. When the lever 75 pivots in the other direction, the movement of the bracket 72 will be correspondingly reversed. As shown in Figure 10, a slot 79 permits the bracket 72 to clear the pin 76 as it pivots. Bolts 80, which extend into the slot 79 from the sides of the bracket 72, engage the pin 76 to thus limit the movement of the bracket, and the amount of movement can be adjusted by turning these bolts.

Figure 12:
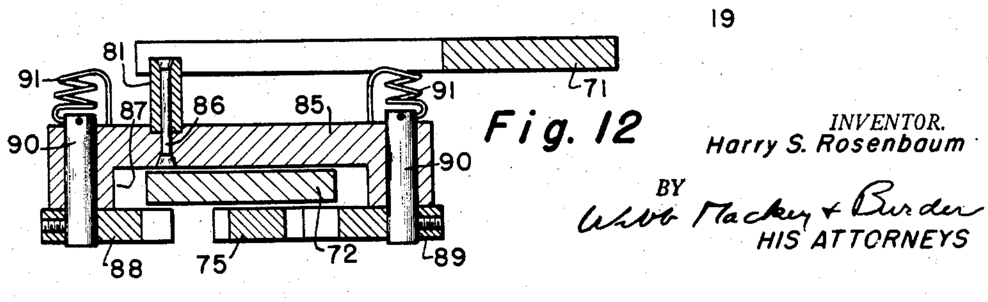
Figure 12 is a section along the lines XII—XII of Figure 9.
Figure 9:
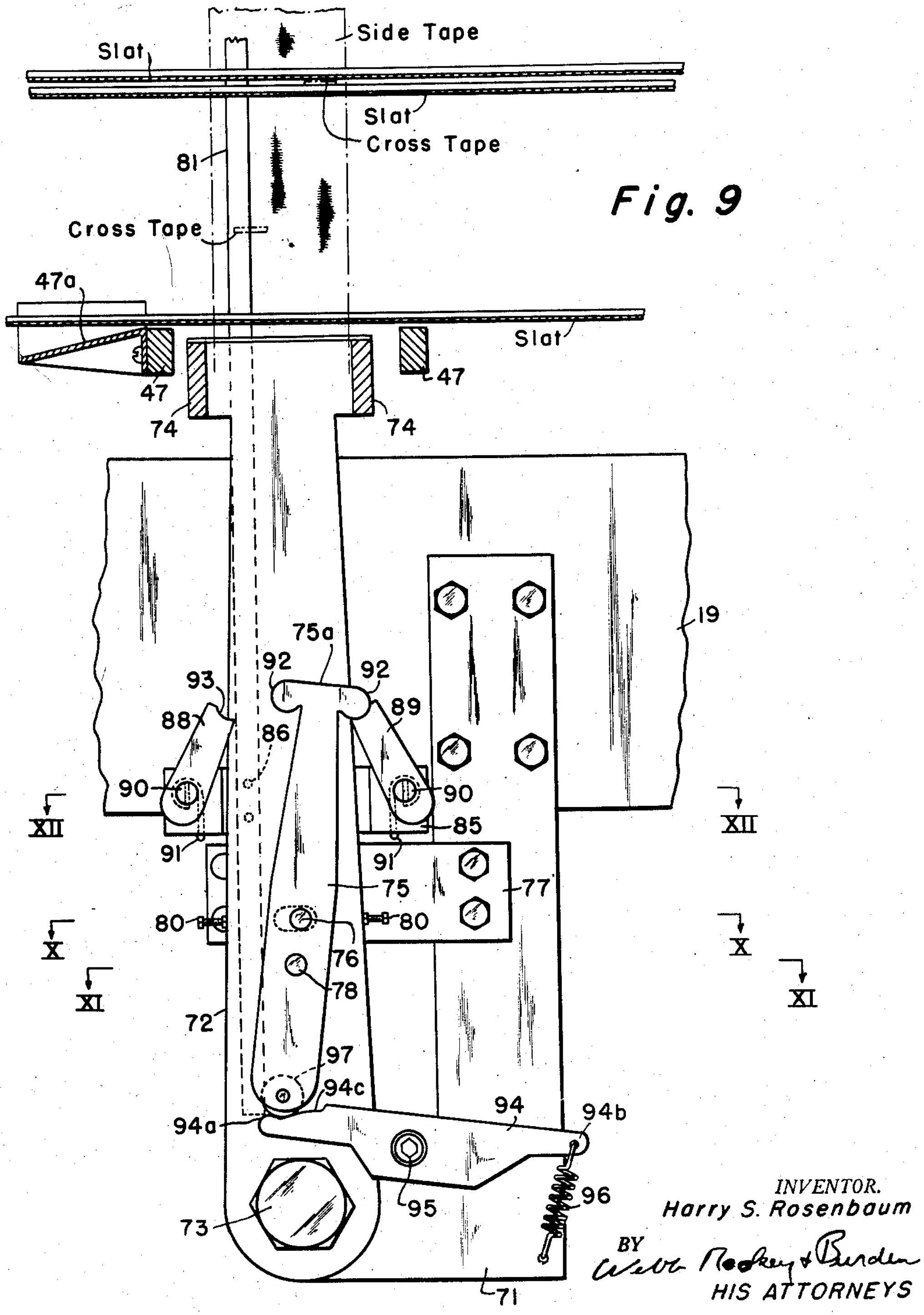
Figure 9 is a vertical section on the lines IX—IX of Figure 4.

The mechanism for pivoting the lever 75 in timed sequence with the other operations of the machine will now be described. Referring to Figure 4, it will be seen that a bar 81 extends vertically in front of the side plate 19 and moves in a guideway 82 provided by the horizontal bracket 77 (see Figure 10). The bar 81 has a pin 83 which extends into a slot 84 in the slat lifter lever 45. Raising and lowering the lever 45 thereby raises and lowers the bar 81 in the guideway 82. Referring to Figures 9 and 12, the bar 81 carries a crosshead 85 held to the bar by means of bolts 86. The crosshead 85 has a recess 87 in its forward face in which the bracket 72 can move back and forth. The face of the crosshead 85 also has two fingers 88 and 89 which are secured to shafts 90 which extend through and can turn in the crosshead. Springs 91 secured to the crosshead and to the shafts 90 urge the free ends of the fingers 88 and 89 towards each other as shown in Figure 9. The upper end of the lever 75 is in the shape of a T with the outer ends 92 of the cross arm **75*a* of the T rounded to conform to curved surfaces 93 on the free ends of the fingers 88 and 89**.

Figure 13:
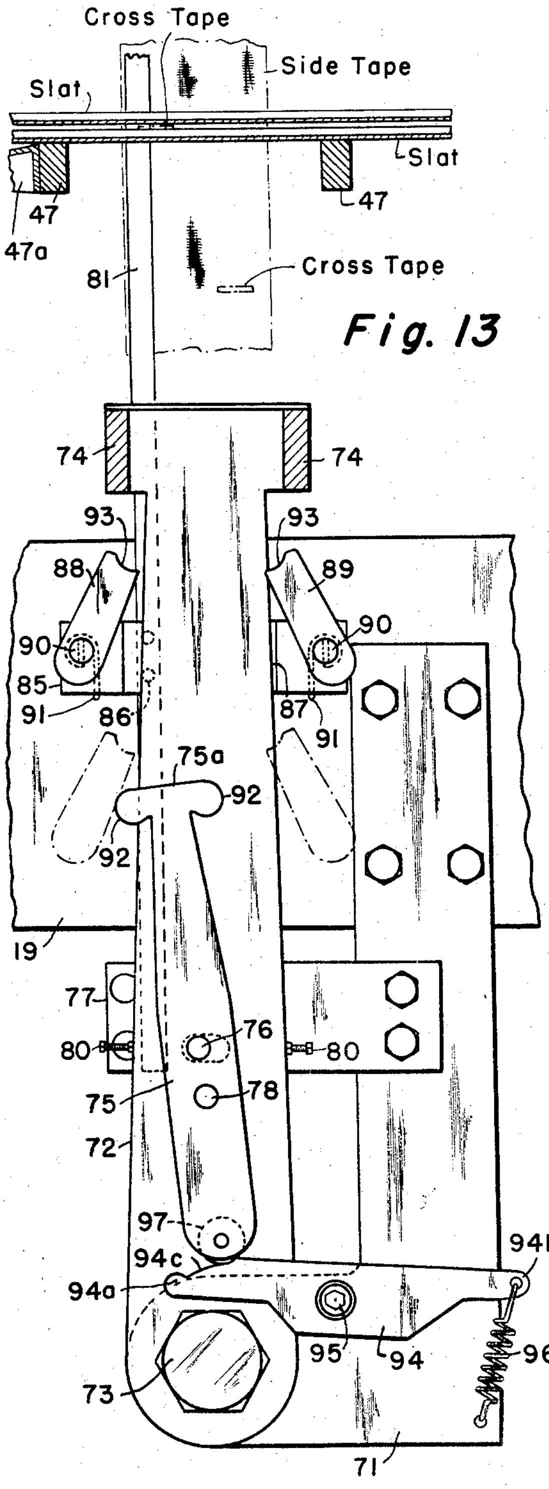
Figure 13 is a section similar to Figure 9, but with the parts in a different operating position.
Figure 14:
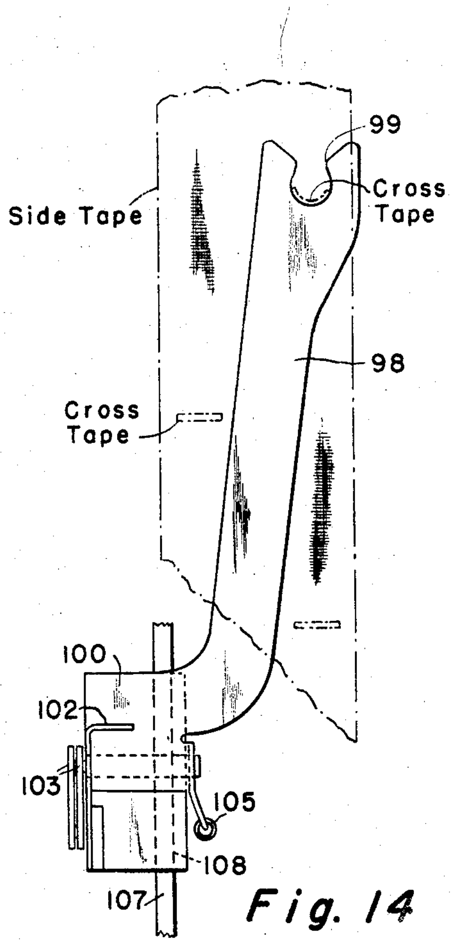
Figure 14 is a front elevation of a tape feeder used in my machine.

When the slat lifter 45 raises the bar 81, it thereby raises the crosshead 85 from the position shown in Figure 9 to the position shown in Figure 13. When this occurs, the finger 89 engages one end of the cross arm **75*a* of the lever 75 and thereby causes the lever 75 to pivot counterclockwise about the pin 76. This in turn will cause the bracket 72 to pivot about the bolt 73 to the right (viewing Figure 9) leaving the lever 75** in the position shown in Figure 13.

At the end of the upper movement of the bar 81, the crosshead 85 will be in the position shown in Figure 13. When the bar comes down, the finger 88 will strike the top of the lever 75 and turn against the force of the spring 91. After the finger has passed the cross arm **75*a*, the spring 91 will turn the finger 88 clockwise to the position shown in Figure 9. When the crosshead 85 is raised, the pin 88 will engage the left-hand end of the cross arm 75*a* and cause the lever 75 to pivot clockwise, thereby moving the bracket 72** to the left.

I provide a latch to hold the lever 75 in the positions to which it is moved by the fingers 88 and 89. A lever 94 pivoted on a bolt 95 carried by the bracket 71 is pressed at one end **94*a* against the lower end of the lever 75 by a spring 96 secured to the opposite end 94*b* of the lever 94 and to the bracket 71. The end 94*a* of the lever 94 has a depression 94*c* in the surface which faces the lever 75. A roller 97 rotatably mounted in the end of the lever 75 rides in the depression 94*c* in the lever 94. As shown in Figures 9 and 13, the depression 94*c* has a bottom curved surface so that at the end of each movement of the lever 75, the roller 97** is held in a shallow notch.

*Tape feeder*

As heretofore noted, my apparatus has a mechanism whereby an operator can feed ladder tapes through and around the tape guides to the assembly points A where slats are fed between the cross tapes and the side tapes of the ladder tapes. This mechanism will now be described.

The tape feeder comprises two fingers which have curved outer ends on which the operator can place the first cross tape of the ladder tape. The fingers are then raised on a guide so that the cross tapes pass through the slot 68 in the tape guide (see Figure 7) and the side tapes are placed outside the guide plates 64—67. Since the side tapes go on opposite sides of the tape guides, two fingers are required so as to spread the side tapes as far apart as the cross tapes will permit. However, the ends of the fingers can be brought together by the operator so that the first cross tape can be looped over both fingers at the same time.

Figures 15, 16:
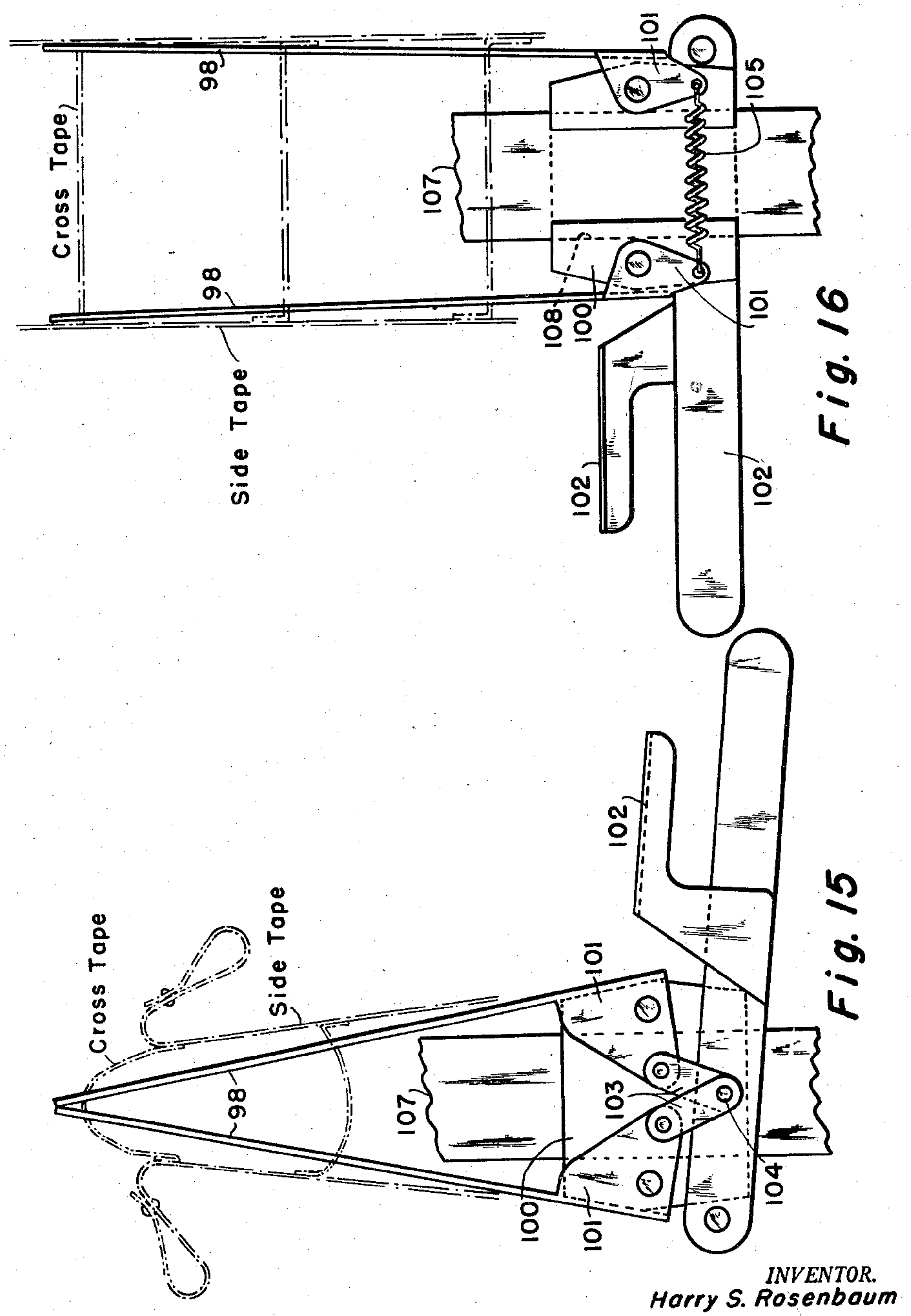
Figure 15 is a side elevation of a tape feeder shown in Figure 14.
Figure 16 is a side elevation of the tape feeder shown in Figure 14 and opposite to that shown in Figure 15.

A tape feeder is shown in detail in Figures 8, 14, 15 and 16. The tape guide comprises two elongated fingers 98 which, when in operative position, extend vertically and have at their upper ends circular recesses 99 in which the first cross tape of the ladder tape being assembled can be placed. As heretofore explained, the tape feeders place the ladder tapes so that the side tapes are against the outside of the guide plates in the tape guides 6. Therefore, the two fingers of the tape feeder spread the side tapes apart to the full extent permitted by the cross tape. Figures 8 and 16 show a ladder tape in position on the tape feeder with the top cross tape held in the recesses 99. The fingers 98 are pivotally mounted at their lower ends on a base 100 by means of triangular plates 101 which extend from the edges of the fingers around the ends of the base 100.

As noted earlier, the fingers 98 can be brought together so that a cross tape can be placed in the recesses 99 of both the fingers at one time. Figures 15 and 16 show the apparatus for bringing the fingers together. A hand lever 102 pivoted at one end on the base 100 has two toggle levers 103 which are connected to the inner ends of the triangular plates 101 and pivot about a single point 104 on the lever 102. By comparing Figures 8 and 15, it can be seen that when the hand lever 102 is pressed downwardly, it pulls the toggle levers 103 downwardly which in turn cause the fingers 98 to pivot at their lower ends towards each other to bring the upper ends of the fingers with the recesses 99 together. On the side of the base opposite to the levers 103, the triangular plates 101 have at their outer ends a spring 105 which tends to keep the fingers 98 separated. To put a tape on the tape feeder, the operator presses downwardly on the lever 102 to bring the tops of the fingers together. He then puts a cross tape in the recesses 99. He releases the hand lever 102, whereupon the fingers pivot away from each other and spread the tape as shown in Figure 16.

I provide a guide on which the tape feeders can slide from a position below the assembly point A where tapes can be placed on the ends of the tape feeders to a position at the assembly point A where slats can be fed between the cross tapes and the side tapes. Referring to Figure 4, a bracket arm 106 extends forwardly from the support bracket 71. The outer end of the bracket arm 106 carries a vertically extending flat bar 107 which is in vertical alignment with the needles 12. The base 100 of the tape feeder has a slot 108 through which the bar 107 passes so that the tape feeders can be slid up and down the bar 107. The outer end of the bracket arm 106 acts as a bottom stop 109 for the tape feeder. When the base 100 of the tape feeder is against the stop, the handle 102 can be pressed downwardly to bring the upper ends of the two fingers 98 together.

Figure 8 shows a tape feeder in its upper position. It will be noted that the fingers 98 extend above the tape guide so that two cross tapes are above the assembly point A. The tape feeder is held in this position by a latch lever 110 pivoted adjacent its center on an ear 111 from the base 100. One arm **110*a* of the lever 110 is curved inwardly towards the guide bar 107 and extends into a notch 112 cut in the edge of the bar 107** and thereby holds the tape feeder in its upper position shown in Figure 8.

As appears in Figure 8, when a slat is lifted, it will engage the second cross tape in the ladder tape held by the tape feeder and thereby pull the ladder tape upwardly with it. The movement of the slats is equal to the distance between the cross tapes. Successive slats will raise additional lengths of the ladder tape through and around the tape guide 6 in increments equivalent to the distance between the cross tapes.

The tape feeder is released from its upper position shown in Figure 8 when the first slat is lifted. A forward and lower corner of the slat lifting lever 45 has a rounded projection or button 113 which, when the lever 45 is raised, engages a cam surface 114 on the outer end of an arm **110*b* of the latch lever 110. When the button 113 strikes the cam surface 114, it pivots the latch 110 clockwise, viewing Figure 8, and thereby withdraws the arm 110*a* from the slot 112 in the guide bar 107**. The tape feeder then drops down to the lower position shown in Figure 4.

SLAT FEEDING MECHANISM

Figures 17, 18:
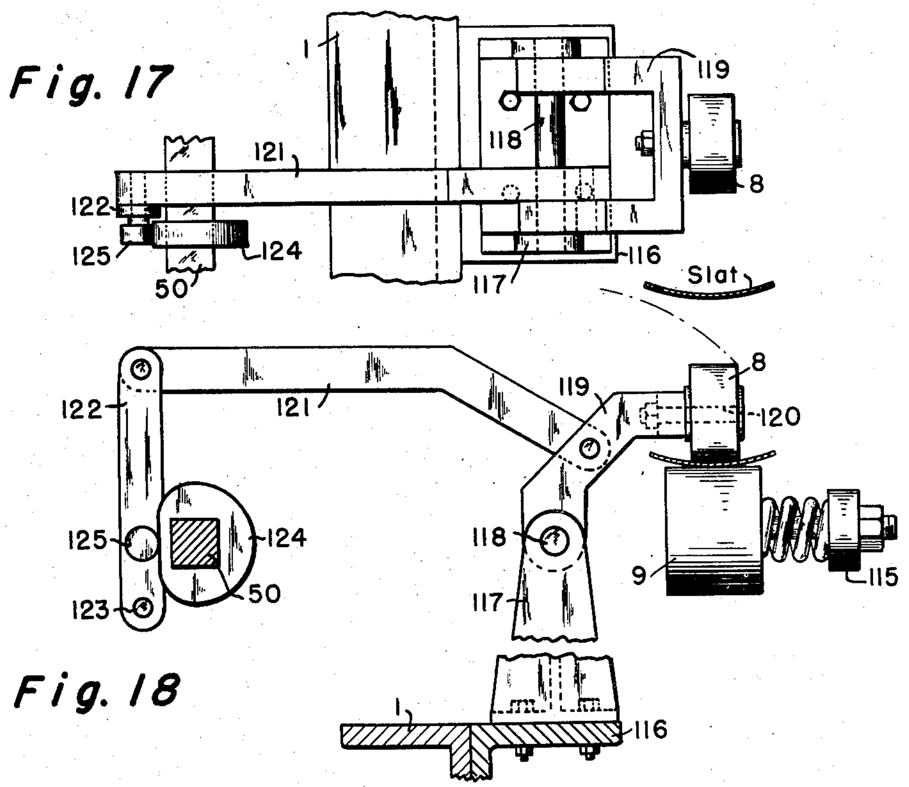
Figure 17 is a plan view of slat feeding mechanism used in my machine.
Figure 18 is a vertical section along the lines XVIII—XVIII of Figure 1 and showing the slat feeder in one operating position.
Figure 19:
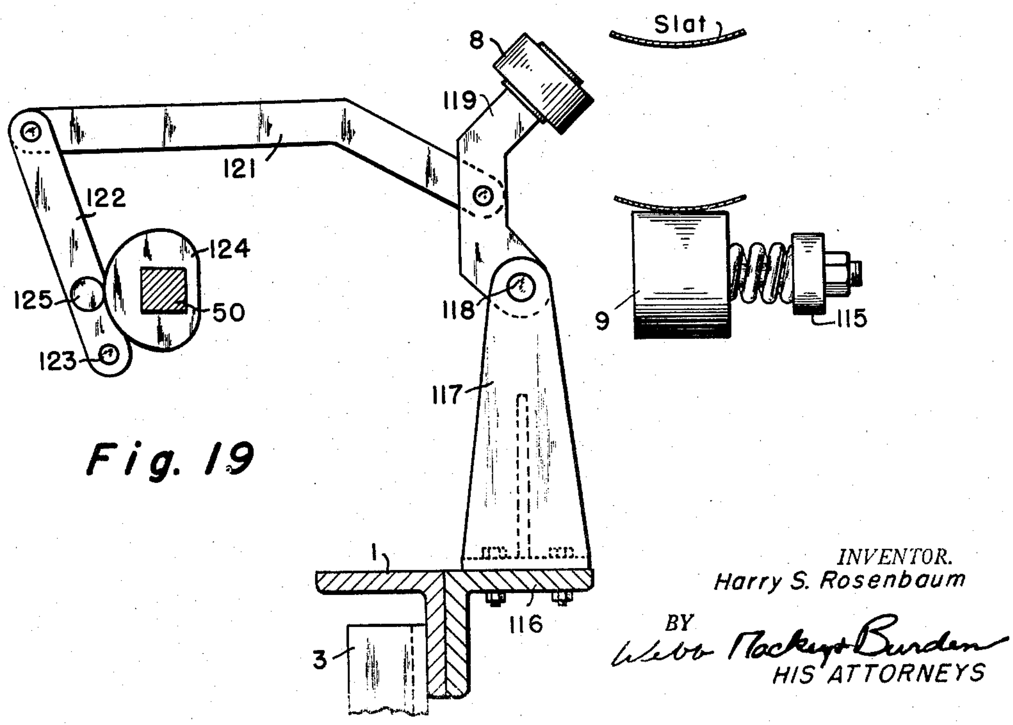
Figure 19 is a vertical section similar to that of Figure 18 but showing the slat feeder in another operating position.

Figures 17, 18 and 19 show the mechanism for feeding slats through the cross tapes after the ladder tapes have been brought through and around the tape guides and are in the position shown in Figure 8. Two feed rollers 8 and 9 receive the slats as they are fed upside down (i. e., concave side up) from the feed table 7 (see Figure 1). The bottom roller 9 is driven through a conventional spring or slip clutch 115 by a motor drive not shown. The top roller 8 holds the slats against the roller 9 so that it can grip them and feed them through the ladder tape on each assembly head. Each time that a slat is raised from the assembly points A, it is necessary to get the top roller 8 out of the way. The mechanism for moving the roller 8 is shown in Figures 17 to 19. An angle 116 secured to the vertical flange of the front angle beam 1, which forms part of the machine base, supports a standard 117. A rod 118 journaled in the top of the standard 117 carries a U-shaped support 119 (see Figure 17) for the roller 8. The roller turns on a shaft 120 secured to the base of the U-shaped support 119.

As appears in Figure 18, the support 119 extends upwardly and outwardly from the shaft 118. An arm 121 pivoted at one of its ends on the support 119 at a point on the support between the shaft 118 and the roller 8 is pivotally connected at its other end to one end of a second lever arm 122. The other end of the lever 122 is pivoted at 123 on a stationary part of the apparatus. The drive shaft 50 which rotates the cam wheels 49 to actuate the slat lifters 45 carries a cam 124 which engages a cam follower 125 on the lever 122. As shown in Figures 18 and 19, rotation of the drive shaft 50 to raise the slats also moves the roller 8 from the position in Figure 18 where it engages the slats to the position shown in Figure 19 where it is vertically clear of the slats so that they can be lifted. The cam 124 and the cam wheels 49 are so placed on the drive shaft 50 that the roller 8 is moved clear of the slats before the slat lifter has raised the slats any substantial distance.

The feed rollers 9 are driven continuously. The operator feeds slats one at a time and upside down to the feed rollers which pass the slats through the several assembly heads until they strike the microswitch 10. As described, striking the switch completes a circuit to rotate the drive shaft 50 through one revolution and thereby raise the slats up in the slat holder 11 and up over the latches **12*c* of the lift cord needles. To guide the slats through each assembly position A, the left-hand prong (viewing Figure 1) of the fork 47 of each slat lifter carries a slat guide 47*a*. One such guide is shown in Figure 9. It is a short channel with sides extending upwardly on each side of the path of the slats and with a sloping bottom leading up to the top surface of the fork 47**.

SLAT HOLDER AND LIFTING CORD NEEDLES

The slat holder 11 and the needles **12*a* or 12*b* hold the assembled slats and tapes in position above the assembly points A before the needles are turned to bring the slats and tapes into position to be secured to a head rail. The position of the slat holder 11 on the central assembly head is shown in Figures 1, 2 and 3 and is shown in more detail in Figure 20. The slat holder is U-shaped, the two arms of the U extending upwardly in front and in back of the slats at and above the assembly points A. The base of the U extends across and beneath the path of travel of the slats through the assembly head and has an extension 126 whereby the slat holder is fastened to the front side plate 19 of the assembly head. Each leg of the slat holder 11 has a latch 127 which extends inwardly towards the other latch and these latches hold the slats at the upper end of the slat holders where they have been raised by the slat lifters. The latches are positioned in slots 128 of the legs of the holder 11 and are pivoted on pins 129 at their lower ends. Springs 130 press the latches outwardly from the legs, outward movement being limited by pins 131 which pass through slots 132 in the latches. When the slats are raised in the slat holder, they press the latches into the slots 128 and thereby permit the slats to be raised up near the top of the slat holder. As soon as the slat has passed the top of the latches, the springs 130** press the latches inwardly beneath the slat and thereafter hold it.

Figures 20, 21, 22, 23:
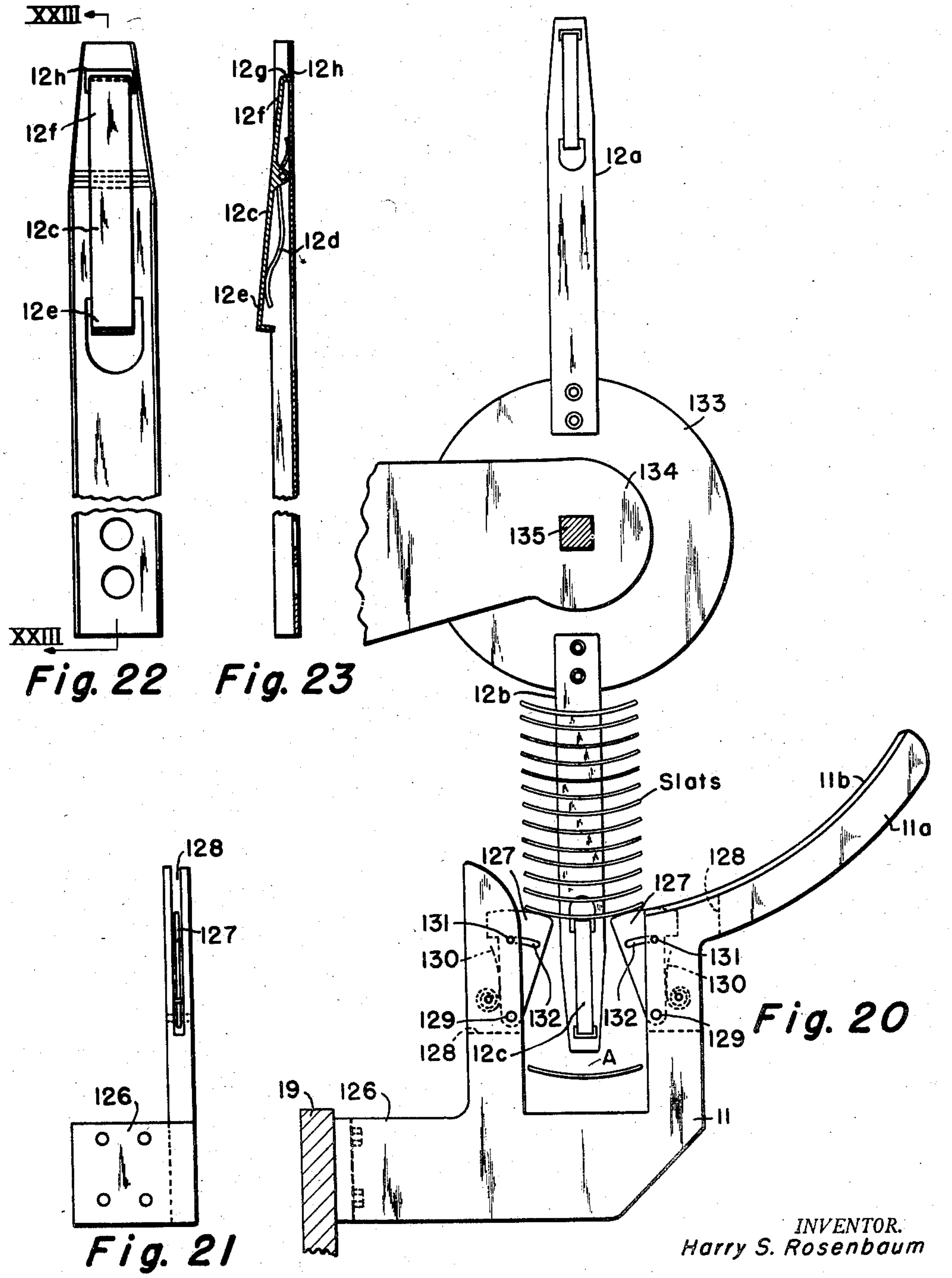
Figure 20 is a side view of the slat holder carried by the central assembly head and of a portion of the right hand assembly head.
Figure 21 is a side view of the slat holder and of a portion of the end assembly head.
Figure 22 is a broken side view of a lifting cord needle used in my machine.
Figure 23 is a section along the lines XXIII—XXIII of Figure 22.

As noted previously, the crosspiece 62 on the stop 61 for the microswitch stops the slats so that the lifting cord holes in the slats are beneath the needles **12*a* or 12*b*, whichever extends downwardly at any particular time. When the slats are raised, the needles pass through the lifting cord holes in the slats and hold the slats in the same elevated position as the slat holder 11 by means of spring latches 12*c* which are located in the ends of the needles (see Figure 20). The spring latches (shown in detail in Figures 22 and 23) are in the form of straight levers with short bent-over ends. The needles are channel shaped in section and the levers are pivoted adjacent their centers within the channels. A leafspring 12*d* forces outwardly away from the needle the end 12*e* of the latch 12*c* which is furthest from the end of the needle. Referring to Figure 23, it will be seen that the end 12*f* of the latch which is nearest the end of the needle is pressed against the needle with the bent-over end 12*g* passing into a slot 12*h* cut in the needle. When slats are passed up over the needles, they move freely past the pivot point of the latch and thereafter press the end 12*e* of the latch towards the needle so that the latch is pivoted to permit passage of the slats. After the slats have passed the end 12*e*, the spring 12*d*** moves it away from the needle and under the slat so as to hold the slat up on the needle.

Figures 24, 25, 26:
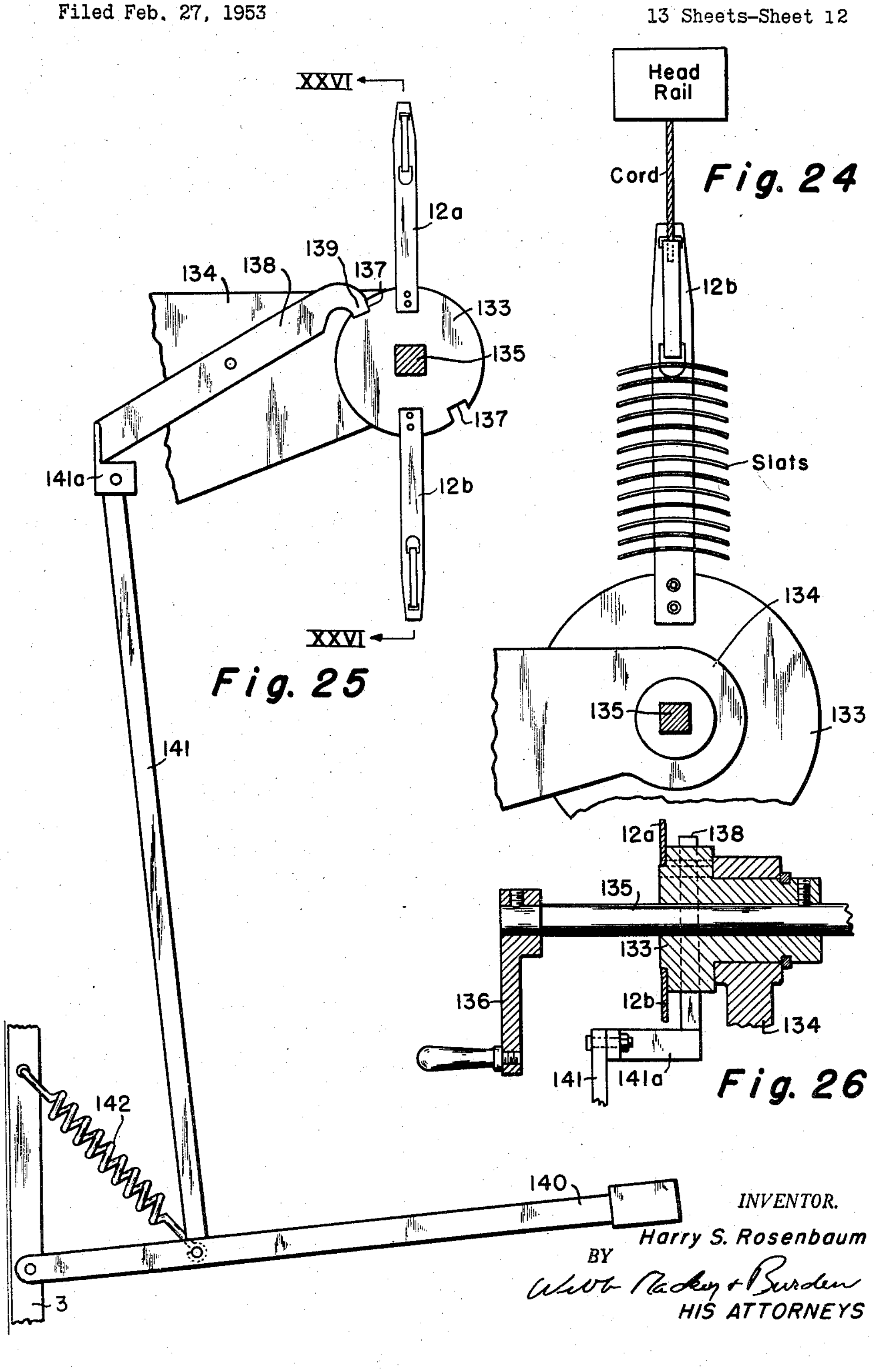
Figure 24 is a section along the lines XXIV—XXIV of Figure 3.
Figure 25 is a side view of mechanism used in my machine to hold lift cord needles in vertical alignment.
Figure 26 is a vertical section along the lines XXVI—XXVI of Figure 25.

After all of the slats for the blind being assembled have been fed through the ladder tapes and have been lifted up onto the needles, the feeding of the slats to the feed rollers 8 and 9 is stopped and the lift cord needles are rotated 180° so as to bring the slats and the cross tapes to the position shown in Figures 3 and 24. The slat holder 11 has an outwardly and upwardly curved extension **11*a* on the front leg of the holder to support the slats when the needles are turning but are still pointed downwardly. The extension 11*a* has a fibre liner 11*b*** to reduce scratching of the slats.

It is obviously necessary to keep the needles **12*a* and 12*b* in correct vertical alignment, both when slats are fed onto them by the slat lifters and when the needles are shifted with the slats and tapes on them to the position shown in Figures 3 and 24. Figures 25 and 26 show the mechanism for turning the needles 180° and for holding them in correct vertical alignment. As appears in Figure 25, the needles 12*a* and 12*b* are secured to a collar 133. A collar 133 is journaled in each of the end assembly heads near the top 134 of the flat casting 18, the top extending forwardly over the assembly points A so as to support the needles vertically in line with the slats as they are lifted by the slat lifter. The collars carry a square shaft 135 which extends through all of the collars. The left-hand end of the shaft 135 (viewing Figures 1 and 3) carries a crank 136. When an operator turns the crank, all of the needles will turn. To enable the operator to turn the needles the correct amount, I provide notches 137 in the left-hand collar 133 (viewing Figure 1) and a lever 138 having an end 139 which fits into the notches 137. The notches 137 are placed in the collar 133 and the lever 138 is pivoted on the top 134 of the assembly head in such position that, when the end 139 of the lever fits in either of the notches 137, the needles are in correct vertical alignment. Before turning the needles, it is necessary, of course, to lift the end 139 of the lever 138 out of notches 137. I provide a foot lever 140 pivoted on the framework 3 for the machine and connected by a lever 141 and a horizontal extension 141*a* to the end of the lever 138 opposite to the end 139. Before turning the needles, the operator steps on the foot lever 140 to lift the end 139 of the lever out of one notch 137. The operator turns the handle 136 until the lever end 139 falls into the other notch 137. The needles will then have turned 180° and be in correct alignment. A spring 142** connected to the lever 140 and the supporting framework 3 tends to turn the lever 138 clockwise (viewing Figure 25) so as to cause the lever end 139 to fall into one of the notches.

BLIND LIFTING MECHANISM

After the needles with the slats and tapes have been turned to the position shown in Figures 3 and 24, a head rail equipped with suitable blind operating mechanism is placed in the brackets 13 and 14 carried by the bar 15. As appears from Figure 2, the brackets 13 and 14 extend forwardly and downwardly from bar 15 so that the head rail in the brackets is directly above the needle arms 12*b*. The tapes on the needles are secured to a tilt bar in the head rail and the lift cords are secured to the needle arms by depressing the projecting ends 12*e* of the latches 12*c* in the ends of the needles and inserting the cord between the needles and the bent-over ends 12*g* of the latches. When the cords are between the needles and the ends 12*g*, the ends 12*e* are held flush with the sides of the needles so that slats can be lifted off the needles.

The bar 15 is then raised in the channels 16 and 17. The head rail in the brackets carries with it the tapes and slats which were on the needles and since the lift cords have been fastened to the ends of the needles, they are pulled through the lift cord holes in all of the slats. After the last slat has cleared the needles 12, the bar 15 is stopped and an operator secures a bottom rail to the ends of the tapes. The operator then raises the blind by pulling on the lift cords and lowers the bar 15 to a position from which the operator can remove the fully assembled blind.

Figures 27, 28, 29, 30:
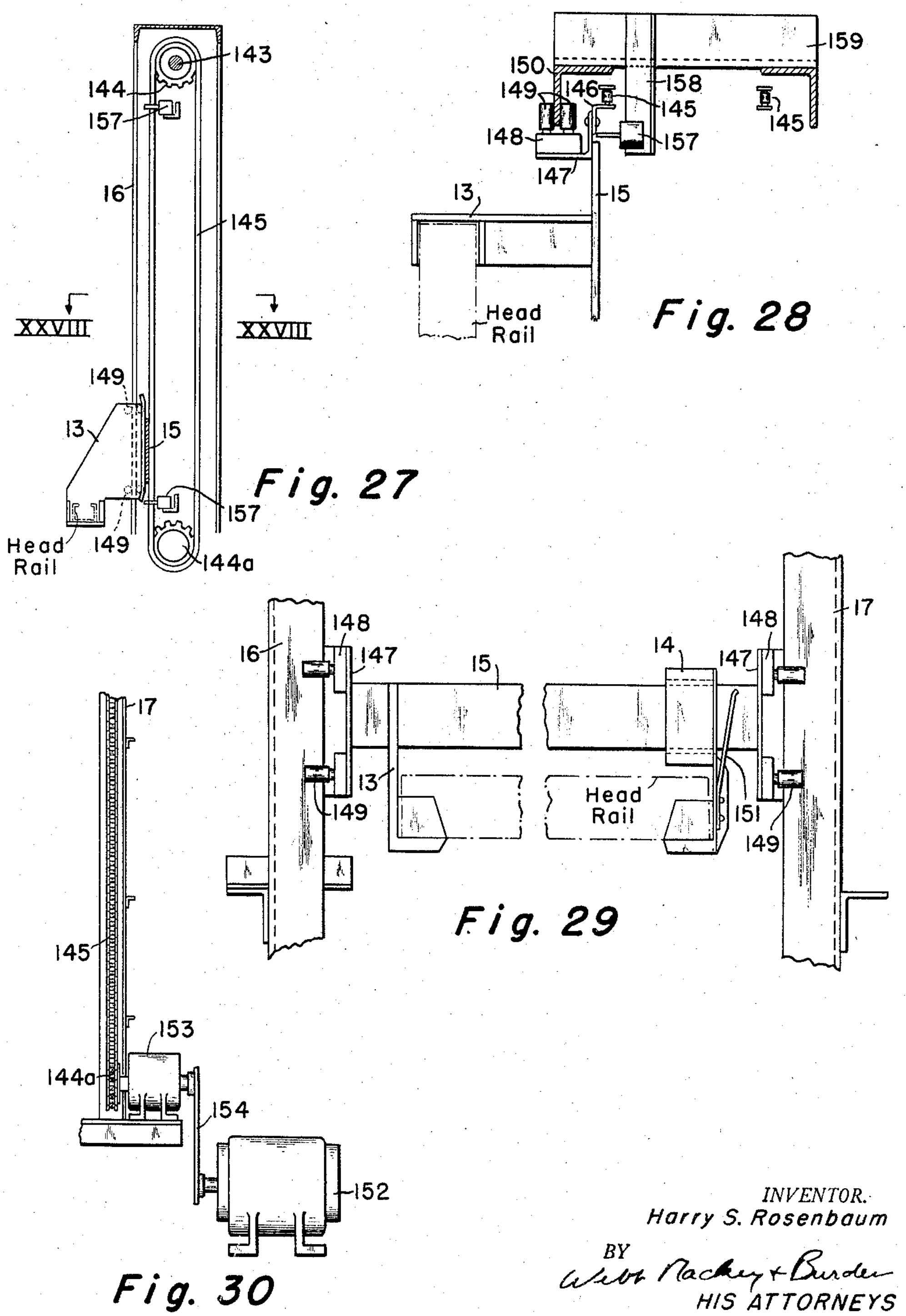
Figure 27 is a vertical section along the lines XXVII—XXVII of Figure 1.
Figure 28 is a section along the lines XXVIII—XXVIII of Figure 27.
Figure 29 is a front elevation of blind conveying mechanism shown in Figures 27 and 28.
Figure 30 is a partial elevation view of the right-hand end of my machine with parts broken away for purposes of illustration.

The blind lifting mechanism is shown in Figures 1, 2 and 3. It includes a shaft 143 journaled in the channels 16 and 17 near their upper ends and chain sprockets 144 carried on the shaft. Chain sprockets 144*a* are also journaled in the channels approximately on a level with the upwardly extending arms of the lift cord needles. Figures 27 to 30 show the lifting mechanism in detail. Endless chains 145 pass over the sprockets 144 and 144*a* near the channels 16 and 17. The bracket bar 15 is carried on the chain 145 as is shown in Figure 28. Small angles 146, which replace the usual side links in the chain, carry angles 147 which in turn support the bar 15 and which also carry a block 148. The block 148 carries two pairs of rollers 149 which engage a flange 150 of each of the channels 16 and 17 and thereby prevent the brackets 13 and 14 which extend forwardly from the bar 15 from turning the bar and the chain.

The bracket 14 can be slid along the bar 15 in order to accommodate head rails and blinds of different widths and the bracket 14 carries a conventional spring clip 151 to hold the bracket in place on the bar (see Figure 29). The clip has a shoulder (not shown) which engages the bottom of the bar 15. Due to the resiliency of the clip, the bracket 14 can be slid to the left (viewing Fig. 29) until it engages a head rail, but it cannot be moved to the right unless the clip is pressed towards the bracket to disengage the shoulder on the clip from the bottom of the bracket.

Figure 30 shows the drive for the chain 145. The motor 152 is mounted adjacent to channel 17 and is connected to a gear reducer 153 by a chain drive 154. This drives the sprocket wheel 144*a* which is adjacent the channel 17 and this drives the sprocket wheel 144 adjacent the channel 17 through the chain 145. This also drives the sprocket wheel 144 which is adjacent the upper end of the channel 16 through the shaft 143 and moves the conveyor chain adjacent the channel 16.

When an operator desires to raise the bar 15, he presses a foot switch 155 adjacent the foot pedal 140 (see Figure 1) and electrically connected to the motor 152. To lower the bar 15, the operator throws a reverse switch 156 carried on the left-hand end of the framework 3 (see Figure 1) and presses on the foot switch 155.

I provide limit switches 157 to prevent accidental overtravel of the bar 15. Brackets 158 which extend inwardly from cross members 159 of the channel 16 support the switches in positions where they will be hit by the bar 15 when it moves upwardly or downwardly.

SUMMARY OF OPERATION

Starting with the tape feeders 5 in their lower position on the guide bars 107 (see Figure 4), an operator brings together the fingers 98 of the feeders and places the first cross tape of each ladder tape in the recesses 99 of the fingers. He then releases the fingers so that they are spread apart and raises the tape feeders on the guide 107 to the position shown in Figures 8 and 14. It will be noted that the fingers 98 are long enough so that two cross tapes are carried above the assembly points A.

Slats are fed by hand or otherwise one at a time to the feed rollers 8 and 9 and they feed the slats through each of the assembly heads 4 and through the cross tapes and side tapes of each ladder tape. The forward end of each slat strikes the microswitch 10 which causes the drive shaft 50 to turn through one revolution. Rotating the drive shaft actuates slat lifters in each head which lift the slats and the ladder tapes upwardly in the slat holder 11 on the central assembly head and up over the needles 12*a* or 12*b* on the end assembly heads. The latches 12*c* on the needles and the latches 127 on the slat holder 11 hold the slats and tapes above the assembly points A.

At the same time that each slat is lifted, the tape guides 6 are reciprocated so as to bring the cross tapes on first one side and then the other side of the needle arms 12*a* or 12*b*. The drive for the slat lifters also lifts the top feed roller 8 out of the way of the slats so that they can be lifted.

As many slats are fed to the assembly apparatus as are required for the particular blind being assembled. The operator then steps on the foot pedal 140 to release the needles 12 and turns them 180° by the crank 136. The slats and the tapes are carried by the needles to the position shown in Figures 3 and 24.

The operator places an assembled head rail in the brackets 13 and 14 of the blind conveyor, connects the lifting cords in the head rail to the top ends of the needles, and connects the ladder tapes to a tilter in the head rail. The operator steps on the foot switch 155 and thereby raises the blind conveyor. This raises the head rail and the tapes since they have been connected to the tilter in the head rail and raising the tapes, of course, raises the slats and pulls them off the needles 12*a* or 12*b*.

When all of the slats have been pulled off the needles, a bottom rail is connected to the lower ends of the tapes. The blind is raised by pulling on the lift cords and the blind conveyor is lowered to a position just above the needles 12 where it can be removed from the brackets for packaging and shipping.

The end assembly heads each have two needles 12*a* and 12*b* to increase the production rate of the assembly machine. At any time after the slats have been put in position for attachment to a head rail (i. e., by turning the needle 180°), a second operator can place tapes on the tape feeders and raise the feeders to their upper position, and the operation of feeding slats through these tapes and raising them on the downwardly extending needles can be carried on while the first operator is completing a blind by pulling the slats and tapes off the needles which extend upwardly.

From the foregoing description, it is apparent that I have invented a relatively simple apparatus for assembling Venetian blinds which greatly reduces the number of manual operations heretofore used in the assembly of Venetian blinds. It enables two or three operators to do what formerly was done by fourteen or fifteen, and thereby greatly reduces the cost of assembling Venetian blinds which heretofore has been a significant part of the total cost of manufacturing Venetian blinds.

While I have described a present preferred embodiment of my invention, it is to be understood that it may be otherwise embodied within the scope of the appended claims.

I claim:

1. A machine for assembling slats, ladder tapes and lift cords of Venetian blinds comprising means for holding ladder tapes at positions for assembly with the slats and with the side tapes of said ladder tapes spaced from each other, means for feeding slats through the ladder tapes at the assembly positions, needles positioned vertically above the assembly positions with one end adjacent said position and having lift cord holding means adjacent said end, said needles also being in line with lift cord holes in the slats, means for raising the assembled slats and tapes whereby the needles pass through the lift cord holes, means for rotating the needles through 180°, and means for raising the slats and tapes after the needles have been turned 180° whereby the slats and tapes can be removed from the needles.

2. A machine for assembling slats, ladder tapes and lift cords of Venetian blinds as described in claim 1 and having a support for a head rail vertically above the needles and slats after the needles have been turned 180° and a conveyor mechanism for raising the support after the tapes have been secured to a tilter in the head rail, and lift cords carried by the head rail have been secured to the needles whereby the slats and tapes are removed from the needles and the lift cords are threaded through the lift cord holes in the slats.

3. In a machine for assembling slats, ladder tapes and lift cords of Venetian blinds in which tapes are held in an assembly position and slats are passed through the cross tapes and side tapes of the ladder tapes, an assembly head comprising a guide for bringing the ladder tapes to the assembly position and holding the cross tapes spaced from each other, a lever pivoted at one end on the assembly head and having its free end positioned below the assembly position to support the slats in said position and movable from a position below to a position above the assembly position whereby slats are lifted from the assembly position after they have been passed through the ladder tapes, and a cam for pivoting said lever.

4. An assembly head as described in claim 3 and having means for holding the slats in raised position above the assembly position.

5. In a machine for assembling slats, ladder tapes and lift cords of Venetian blinds and having a base and assembly heads on the base for supporting and driving tape guides and slat lifting mechanisms, means for adjusting the distance of the assembly heads from each other on the base, said adjusting means comprising a rack on the base, a first gear on a shaft journaled in each assembly head, said gear meshing with the rack, a second gear on each shaft, a rack slidably carried by the assembly heads and meshing with said second gear associated with each assembly head, means for rotating one of said shafts and moving the assembly head with which it is associated along the base and turning the other shafts on the other assembly heads through said slidable rack, said first and second gears on each shaft being of different diameter whereby the shafts move correspondingly different distances along said base.

6. In a machine for assembling slats, ladder tapes and lift cords of Venetian blinds in which tapes are held in assembly positions and slats are passed through the cross tapes and side tapes of the ladder tapes at said positions, a guide for a tape as it is brought to an assembly position, said guide being positioned in the path of travel of the tapes to the assembly position whereby it extends between the side tapes of the ladder tapes and comprising an elongated member extending along the path of the slat to the assembly position, said member adjacent the assembly point having a thickness approximately equal to the length of the cross tapes of the ladder tapes and decreasing in thickness towards its other end, said member also having a central longitudinal slot extending the full length of the member.

7. A tape guide as described in claim 6 in whch said member comprises two pairs of flat elongated plates, the plates in each pair lying in the same plane but spaced from each other, the two pairs of plates lying parallel to but spaced from each other a distance approximately equal to the length of the cross tapes for a portion of the lengths of the plates, the plates sloping towards each other for another portion of their lengths, the spaces between the plates in each pair lying in a common plane at right angles to the planes of the plates.

8. A tape guide as described in claim 6 and having a reciprocating support whereby tapes may be guided to two different positions on the assembly machine.

9. In a machine for assembling slats, ladder tapes and lift cords of Venetian blinds in which tapes are held in assembly positions and slats are passed through the cross tapes and side tapes of the ladder tapes at said positions, a tape guide for bringing ladder tapes to an assembly position and a support for said guide, said support comprising a bracket pivoted on the assembly machine at one end and carrying the guide at its other end, a lever pivoted on the assembly machine and pivotally connected to the bracket, and means for rocking the second lever about its pivot on the assembly machine whereby rocking the second lever will cause the bracket to rock on its pivot on the assembly machine.

10. A tape guide as described in claim 9 in which the means for rocking said second lever comprises laterally extending projections adjacent one end of the lever and a reciprocating crosshead having fingers on opposite sides of the second lever which alternately engage the projections and thereby turn the lever in alternate directions about its pivot.

11. A tape guide as described in claim 9 and having means to limit the movement of the support lever about its pivot.

12. In a machine for assembling slats, ladder tapes and lift cords of Venetian blinds in which tapes are held in assembly positions and slats are passed through the cross tapes and side tapes of the ladder tapes at said positions, means for feeding a tape to an assembly position comprising a bar extending parallel to the path of movement of tapes through the assembly machine with one end adjacent the assembly position, a base adapted to slide on said bar, elongated fingers spaced from each other and extending vertically from said base when in operative position, and means at the upper ends of the fingers to hold cross tapes of ladder tapes, the arms having sufficient length to extend from the end of said bar beyond the assembly position.

13. A tape feeder as described in claim 12 and having means for bringing the free ends of the fingers together.

14. A tape feeder as described in claim 12 and having means for holding said base at a point on said bar adjacent the assembly position, and means for releasing the base from said point.

15. A tape feeder as described in claim 12 in which said fingers are pivoted on said base and in which said base carries a lever operatively connected to said fingers whereby movement of the lever rotates the fingers on the pivots to bring the free ends of the fingers together.

16. In a machine for assembling slats, ladder tapes and lift cords of Venetian blinds in which tapes are held in assembly positions and slats are passed through the cross tapes and side tapes of the ladder tapes and thereafter raised above the assembly positions, means for holding the slats above an assembly position comprising a needle extending vertically in line with and above lift cord holes in the slats when the slats are in the assembly position, a latch pivoted adjacent the end of the needle adjacent the assembly position, said latch having an arm resiliently extended beyond a surface of the needle thereby permitting slats to pass over the needle by depressing the extended arm when they are raised but restraining downward movement on the needle, and a support for said needle.

17. In a machine for assembling slats, ladder tapes and lift cords of Venetian blinds in which tapes are held in assembly positions and slats are passed through the cross tapes and side tapes of the ladder tapes and thereafter raised above the assembly positions, means for threading a lift cord through lift cord holes in the slats comprising a needle extending vertically in line with and above lift cord holes in the slats when the slats are in assembly position, a rotatable support for the needle whereby the needle can be turned from a downwardly to an upwardly extending position, and a pivoted spring-loaded latch on the end of said needle, said latch having one arm which extends out from the needle and retains slats when they are raised up over the needle in its downwardly extending position, said latch also having another arm adapted to engage lift cords when the needle is in its upwardly extending position, movement of the latch to engage a lift cord retracting said first mentioned arm to permit removal of the slats from the needle.

18. In a machine for assembling slats, ladder tapes and lift cords of Venetian blinds, a needle for threading lift cords through the slats comprising an elongated member and a latch at one end of the member, said latch being pivoted adjacent its center on the needle thereby forming two arms, the arm of the latch extending from the pivot towards the end of the needle being adapted to retain lift cords, and the arm of the latch extending from the pivot away from the end of the needle being adapted to prevent slats from sliding off the needle.

19. A lift cord needle as described in claim 18 and having a spring tending to turn the latch on its pivot whereby the latch arm extending from the pivot towards the end of the needle is pressed against the needle and the arm extending from the pivot away from the end of the needle is urged away from the needle and beyond the surface of the needle whereby slats may be prevented from sliding off the needle.

20. In a machine for assembling slats, ladder tapes and lift cords of Venetian blinds, a needle for threading lift cords through the slats comprising an elongated member channel-shaped in section, a latch pivoted adjacent its center within the sides of said member adjacent one end of the member and thereby forming two arms of said latch, a spring tending to turn the latch on its pivot whereby the arm extending from the pivot towards the end of the needle is resiliently held against the needle with the end of the arm within the sides of the needle and whereby the arm extending from the pivot away from the needle end is resiliently held away from the needle with the end of the arm extending beyond the sides of the needle, the pivot for the latch and the length of the latch arms being adjusted whereby when a lift cord is inserted between the needle and the arm of the latch extending from the latch pivot towards the end of the needle, the other arm is brought substantially flush with the sides of the needle.

21. A machine for assembling slats, ladder tapes and lifting cords of Venetian blinds comprising oscillatable guide means for holding ladder tapes at positions for assembly with the slats and with the side tapes of said ladder tapes spaced from each other, means for feeding slats through the ladder tapes at the assembly positions, an indexable support mounted opposite said guide means, needles having lift cord holding means adjacent their ends, said needles being supported by said indexable support with one set of needles facing said assembly positions in line with lift cord holes in the slats, lever means for raising the assembled slats and tapes whereby the needles pass through the lift cord holes, means synchronized with said lever means for oscillating said ladder tape guide means so as to position the cross tapes of the ladder tapes on alternate sides of said lift cord needles, means for indexing said needle supporting means so that tapes and slats after assembly are in a closely stacked arrangement on the needles and in a position removed from the place of assembly, and means for removing the slats and tapes from the needles after lift cords have been secured to the needles.

References Cited in the file of this patent

UNITED STATES PATENTS

| | | |
|---|---|---|
| 2,489,467 | Sherwood | Nov. 29, 1949 |
| 2,532,294 | Edwards et al. | Dec. 5, 1950 |
| 2,635,333 | Vodra | Apr. 21, 1953 |